United States Patent
Park et al.

(10) Patent No.: US 10,582,408 B2
(45) Date of Patent: Mar. 3, 2020

(54) METHOD FOR REPORTING REFERENCE SIGNAL MEASUREMENT INFORMATION BY TERMINAL IN WIRELESS COMMUNICATION SYSTEM, AND APPARATUS SUPPORTING SAME

(71) Applicant: LG Electronics Inc., Seoul (KR)

(72) Inventors: Hanjun Park, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/324,796

(22) PCT Filed: Aug. 11, 2017

(86) PCT No.: PCT/KR2017/008747
§ 371 (c)(1),
(2) Date: Feb. 11, 2019

(87) PCT Pub. No.: WO2018/030841
PCT Pub. Date: Feb. 15, 2018

(65) Prior Publication Data
US 2019/0182698 A1 Jun. 13, 2019

Related U.S. Application Data
(60) Provisional application No. 62/373,962, filed on Aug. 11, 2016.

(51) Int. Cl.
*H04W 24/10* (2009.01)
*H04B 17/318* (2015.01)

(52) U.S. Cl.
CPC .......... *H04W 24/10* (2013.01); *H04B 17/318* (2015.01)

(58) Field of Classification Search
None
See application file for complete search history.

(56) References Cited

U.S. PATENT DOCUMENTS

| | | |
|---|---|---|
| 2014/0295860 A1 | 10/2014 | Kuo |
| 2015/0201383 A1 | 7/2015 | Papasakellariou et al. |
| 2016/0043843 A1 | 2/2016 | Liu et al. |
| 2016/0095108 A1 | 3/2016 | Ryoo et al. |
| 2016/0219619 A1 | 7/2016 | Guo |

(Continued)

FOREIGN PATENT DOCUMENTS

KR  1020180023026  3/2018

OTHER PUBLICATIONS

Samsung, "Discussion on Beam Measurement for 5G New Radio Interface in mmWave Frequency Bands", 3GPP TSG RAN WG2 Meeting #94, R2-163652, May 13, 2016 See p. 1-4. (Year: 2016).*

(Continued)

*Primary Examiner* — Anh Vu H Ly
(74) *Attorney, Agent, or Firm* — Fish & Richardson P.C.

(57) ABSTRACT

Disclosed are: a method for reporting reference signal measurement information for a secondary base station by a terminal, connected to both a master base station and the secondary base station according to a dual connectivity scheme, in a wireless communication system comprising the master base station and the secondary base station that is operated under the control of the master base station and employs multiple analog beams; and an apparatus supporting the same.

14 Claims, 14 Drawing Sheets

(56) References Cited

U.S. PATENT DOCUMENTS

| | | | | |
|---|---|---|---|---|
| 2016/0337916 A1* | 11/2016 | Deenoo | ............... | H04W 8/22 |
| | | | | 370/328 |
| 2017/0026938 A1* | 1/2017 | Onggosanusi | ....... | H04B 7/0626 |
| | | | | 370/328 |
| 2017/0251518 A1* | 8/2017 | Agiwal | ................ | H04W 24/08 |
| | | | | 370/328 |
| 2017/0331577 A1* | 11/2017 | Parkvall | ............... | H04J 11/0079 |
| | | | | 370/328 |
| 2017/0331670 A1* | 11/2017 | Parkvall | ............ | H04W 52/0274 |
| | | | | 370/328 |
| 2017/0339662 A1* | 11/2017 | Lin | .................... | H04W 64/006 |
| | | | | 370/328 |
| 2018/0035438 A1* | 2/2018 | Pao | ................... | H04W 72/0413 |
| | | | | 370/328 |
| 2018/0198510 A1* | 7/2018 | Park | ........................ | H04B 7/04 |
| | | | | 370/328 |
| 2019/0253115 A1* | 8/2019 | Park | ........................ | H04B 7/06 |
| | | | | 370/328 |

OTHER PUBLICATIONS

Ericsson, "Mobility measurements and procedures", 3GPP TSG RAN WG2 Meeting #94, R2-164001, May 14, 2016 See p. 1-5. (Year: 2016).*

InterDigital Communications, "Beam-based aspects for New Radio", 3GPP TSG RAN WG2 Meeting #94, R2-164121, May 14, 2016 See p. 3. (Year: 2016).*

PCT International Search Report and Written Opinion in International Appln. No. PCT/KR2017/008747, dated Nov. 29, 2017, 16 pages (with English translation).

* cited by examiner

METHOD FOR REPORTING REFERENCE SIGNAL MEASUREMENT INFORMATION BY TERMINAL IN WIRELESS COMMUNICATION SYSTEM, AND APPARATUS SUPPORTING SAME

CROSS-REFERENCE TO RELATED APPLICATIONS

This application is a National Stage application under 35 U.S.C. § 371 of International Application No. PCT/KR2017/008747, filed on Aug. 11, 2017, which claims the benefit of U.S. Provisional Application No. 62/373,962, filed on Aug. 11, 2016. The disclosures of the prior applications are incorporated by reference in their entirety.

TECHNICAL FIELD

The following description relates to a wireless communication system and, more particularly, to a method of reporting reference signal measurement information for a secondary base station by a user equipment, connected to a master base station and the secondary base station by a dual connectivity scheme, in a wireless communication system including the master base station and a secondary base station which is operated under control of the master base station and operates a plurality of analog beams, and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DETAILED DESCRIPTION OF THE INVENTION

Technical Problems

An object of the present invention is to provide a method of reporting reference signal measurement information in a dual connectivity situation of a user equipment in a newly proposed communication system, and an apparatus therefor.

Particularly, an object of the present invention is to provide a method of reporting reference signal measurement information for a secondary base station by a user equipment, connected to a master base station and the secondary base station by a dual connectivity scheme, in a wireless communication system including the master base station and a secondary base station which is operated under control of the master base station and operates a plurality of analog beams.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method of reporting reference signal measurement information for a secondary base station by a user equipment, connected to a master base station and the secondary base station by a dual connectivity scheme, in a wireless communication system including the master base station and a secondary base station which is operated under control of the master base station and operates a plurality of analog beams, and an apparatus therefor.

According to an aspect of the present invention, provided herein is a method of reporting reference signal measurement information for a secondary base station by a user equipment, connected to a master base station and the secondary base station by a dual connectivity scheme, in a wireless communication system including the master base station and the secondary base station which is operated under control of the master base station and operates a plurality of analog beams. The method includes calculating measurement values according to one or more of a first measurement method of measuring signal quality of the secondary base station, based on a reference signal transmitted by the secondary base station, and a second measurement method of measuring an optimal analog beam for data transmission among the plurality of analog beams operated by the secondary base station; and transmitting the measurement values calculated according to one or more of the first measurement method and the second measurement method to the master base station or the secondary base station, wherein the measurement value calculated according to the first measurement method is transmitted to the master base station and the measurement value calculated according to the second measurement method is transmitted to the secondary base station.

In another aspect of the present invention, provided herein is a user equipment for reporting reference signal measurement information for a secondary base station, the user equipment being connected to a master base station and the secondary base station by a dual connectivity scheme, in a wireless communication system including the master base station and the secondary base station being operated under control of the master base station and operates a plurality of analog beams. The user equipment includes a transmitter; a receiver; and a processor connected to the transmitter and the receiver to perform an operation, wherein the processor is configured to calculate measurement values according to one or more of a first measurement method of measuring signal quality of the secondary base station, based on a reference signal transmitted by the secondary base station, and a second measurement method of measuring an optimal analog beam for data transmission among the plurality of analog beams operated by the secondary base station; and transmit the measurement values calculated according to one or more of the first measurement method and the second measurement method to the master base station or the secondary base station, and wherein the measurement value calculated according to the first measurement method is transmitted to the master base station and the measurement value calculated according to the second measurement method is transmitted to the secondary base station.

The user equipment may further receive information on the reference signal from the master base station.

The information on the reference signal may include one or more of a time resource on which the reference signal is transmitted, a frequency resource on which the reference signal is transmitted, and a sequence applied to the reference signal.

The measurement value calculated according to the first measurement method may include one or more of information on average received power for the reference signal per analog beam, and information on average received power for the reference signal transmitted by the secondary base station during a predetermined duration.

If the measurement value calculated according to the first measurement method satisfies a predetermined condition or if the master base station commands the user equipment to report a measurement result, the measurement value calculated according to the first measurement method may be transmitted to the master base station.

The measurement value calculated according to the second measurement method may include one or more of received strength for the reference signal per analog beam and information on one or more analog beams having reception performance of a predetermine value or more among the plurality of analog beams.

If the measurement value calculated according to the second measurement method satisfies a specific condition or if the secondary base station commands the user equipment to report a measurement result, the measurement value calculated according to the second measurement method may be transmitted to the secondary base station.

The user equipment may further receive analog beam information during a time duration in which the measurement values according to one or more of the first measurement method and the second measurement method based on the reference signal from the master base station are calculated.

The analog beam information may include information on an analog beam applied in units of one or more symbols.

The user equipment may further receive, from the master base station, information as to whether there is a change in an analog beam operation scheme of the secondary base station and information on a changed serving beam.

The change in the analog beam operation scheme of the secondary base station may include a change in an analog phase shift value applied to a serving beam of the secondary base station.

Upon determining that the user equipment and the secondary base state are disconnected, a signal for requesting a report of the measurement value calculated according to the second measurement method may be transmitted to the master base station, and a signal for triggering the report of the measurement value calculated according to the second measurement method may be received from the master base station. The user equipment may calculate the measurement value according to the second measurement method, based on the signal for triggering the report of the measurement value calculated according to the second measurement method, and transmit the measurement value according to the second measurement method to the secondary base station.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a Secondary Cell Group (SCG) to which a user equipment is connected by a dual connectivity scheme operates a plurality of analog beams in a newly proposed wireless communication system, the user equipment can efficiently transmit a reference signal measurement result for the SCG.

Particularly, according to the present invention, the user equipment can directly transmit a measurement result usable for the purpose of addition/release or activation/deactivation of the SCG to the MCG and directly transmit a measurement result usable for the purpose of configuring an analog beam (or a serving beam) for data transmission/reception within the SCG to the SCG.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
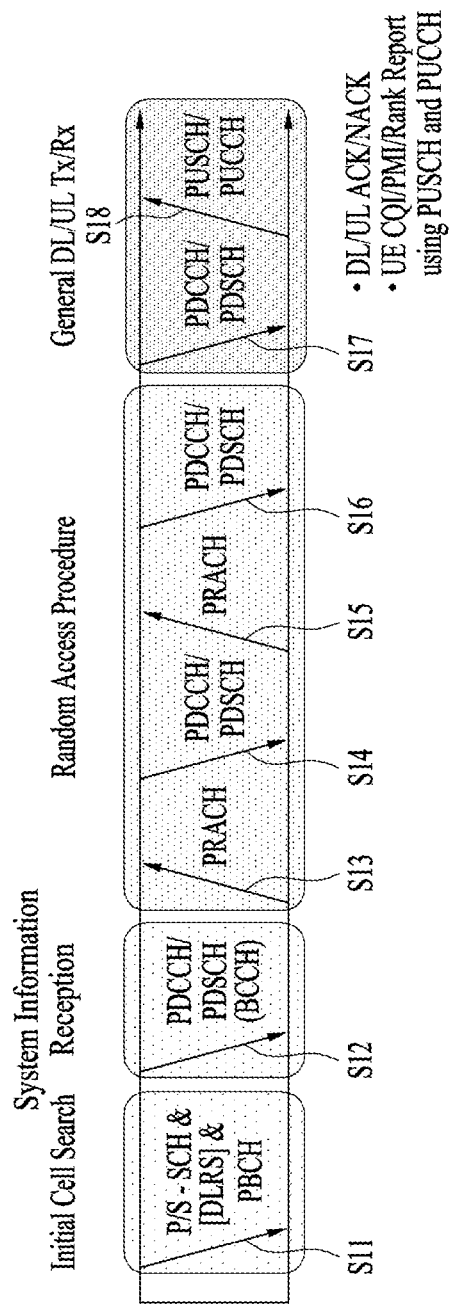
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3 GPP LTE/LTE-A System 1.1 Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
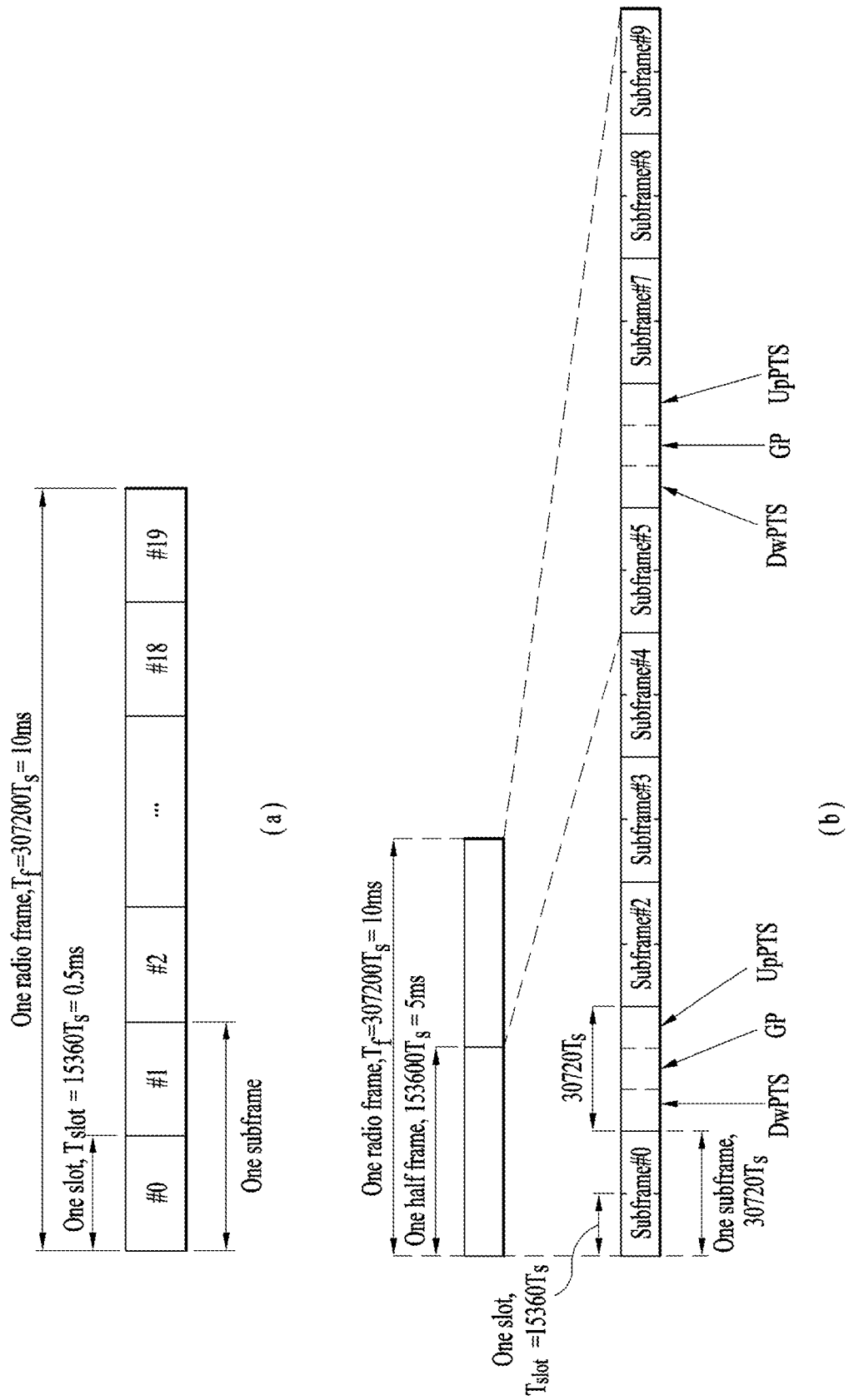
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
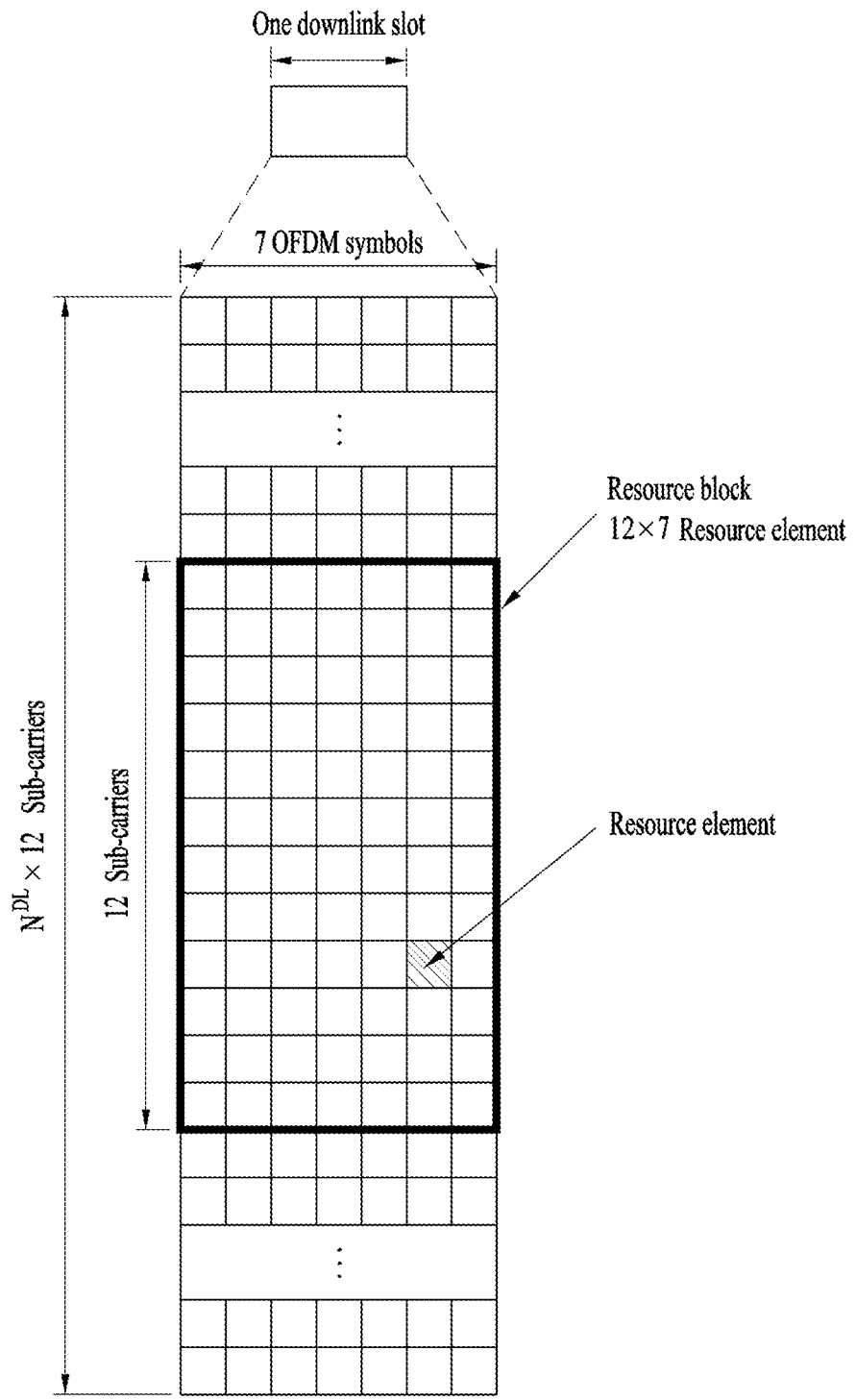
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
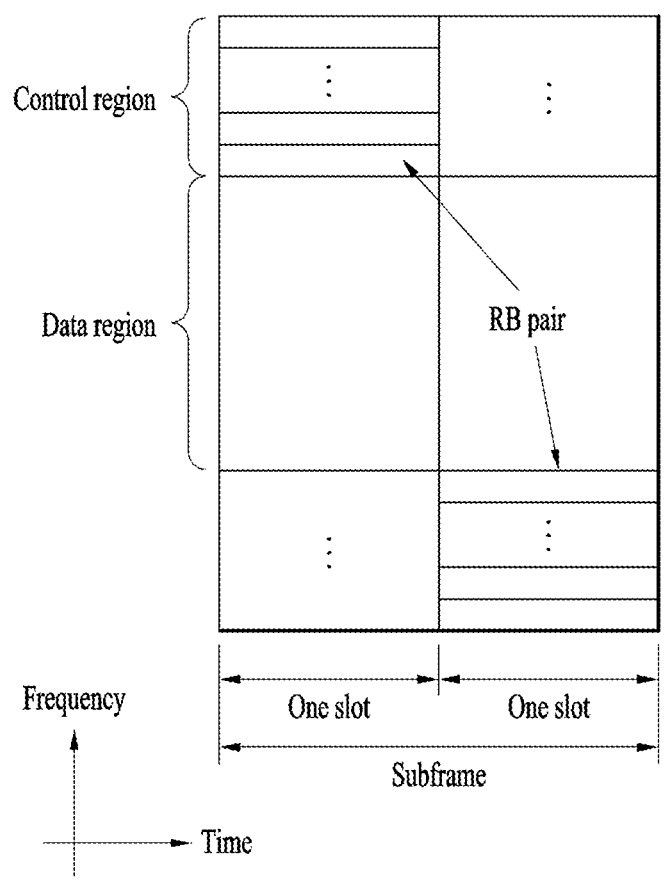
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
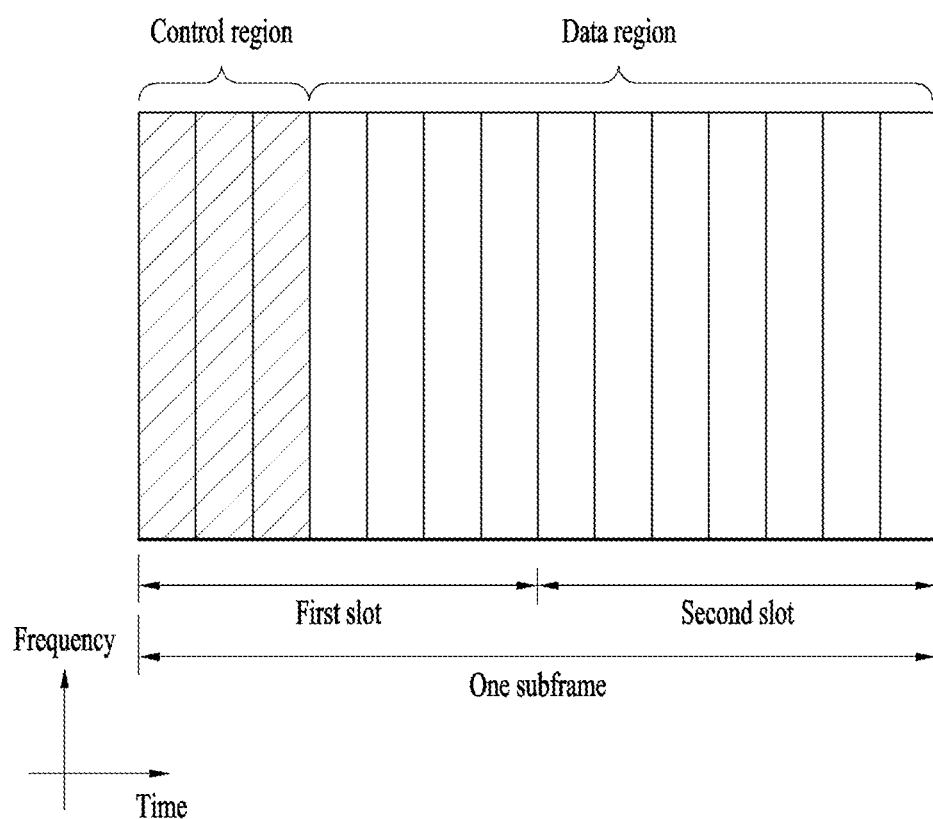
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. Radio Resource Management (RRM) Operation

The LTE system supports an RRM operation including power control, scheduling, cell search, cell re-selection, handover, radio link or connection monitoring, connection establishment/re-establishment, and the like. In this case, a serving cell may request that the UE transmit RRM information, which is a measurement value for performing the RRM operation. Typically, in the LTE system, the UE may measure cell search information, Reference Signal Received Power (RSRP), and Reference Signal Received Quality (RSRQ) of each cell and report the same. Specifically, in the LTE system, the UE receives 'measConfig' as a higher-layer signal for RRM from the serving cell. The UE measures RSRP or RSRQ according to information of measConfig.

Herein, RSRP, RSRQ, and a Received Signal Strength Indicator (RSSI) defined in the LTE system may be defined as follows.

RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA carrier RSSI, comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc.) If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

According to the above definition, in the case of intra-frequency measurement, the UE operating in the LTE system may measure RSRP in a bandwidth indicated by an allowed measurement bandwidth related Information Element (IE) transmitted in System Information Block type 3 (SIB3). Alternatively, in the case of inter-frequency measurement, the UE may measure RSRP in a bandwidth corresponding to one of 6, 15, 25, 50, 75, and 100 RBs, indicated by an allowed measurement bandwidth transmitted in System Information Block type 5 (SIB5). Alternatively, in the absence of the IE, the UE may measure RSRP in all frequency bands of a DL system by default.

Upon receiving information about an allowed measurement bandwidth, the UE may regard a corresponding value as a maximum measurement bandwidth and freely measure the value of RSRP within the corresponding value. However, if the serving cell transmits an IE defined as a Wide Band RSRQ (WB-RSRQ) to the UE and sets the allowed measurement bandwidth to 50 RBs or more, the UE needs to calculate the value of RSRP for a total allowed measurement bandwidth. Meanwhile, during RSSI measurement, the UE measure RSSI in a frequency bandwidth of a receiver of the UE according to definition of an RSSI bandwidth.

According to the above definition, the UE operating in the LTE system may be allowed to measure RSRP in a bandwidth corresponding to one of 6, 15, 25, 50, 75, and 100 RBs, based on an allowed measurement bandwidth related IE transmitted in SIB3, in the case of intra-frequency measurement and may be allowed to measure RSRP in a bandwidth corresponding to one of 6, 15, 25, 50, 75, and 100 RBs, based on an allowed measurement bandwidth related IE transmitted in SIB5, in the case of inter-frequency measurement. Alternatively, in the absence of the IE, the UE may measure RSRP in all frequency bands of a DL system by default.

Upon receiving information about an allowed measurement bandwidth related IE, the UE may regard a corresponding value as a maximum measurement bandwidth and freely measure the value of RSRP within the corresponding value. However, if the serving cell transmits an IE defined as a WB-RSRQ to the UE and sets the allowed measurement bandwidth to 50 RBs or more, the UE needs to calculate the value of RSRP for a total allowed measurement bandwidth. Meanwhile, the UE measure RSSI in a frequency bandwidth of the receiver of the UE according to definition of an RSSI bandwidth.

1.5. Dual Connectivity

Figure 6:
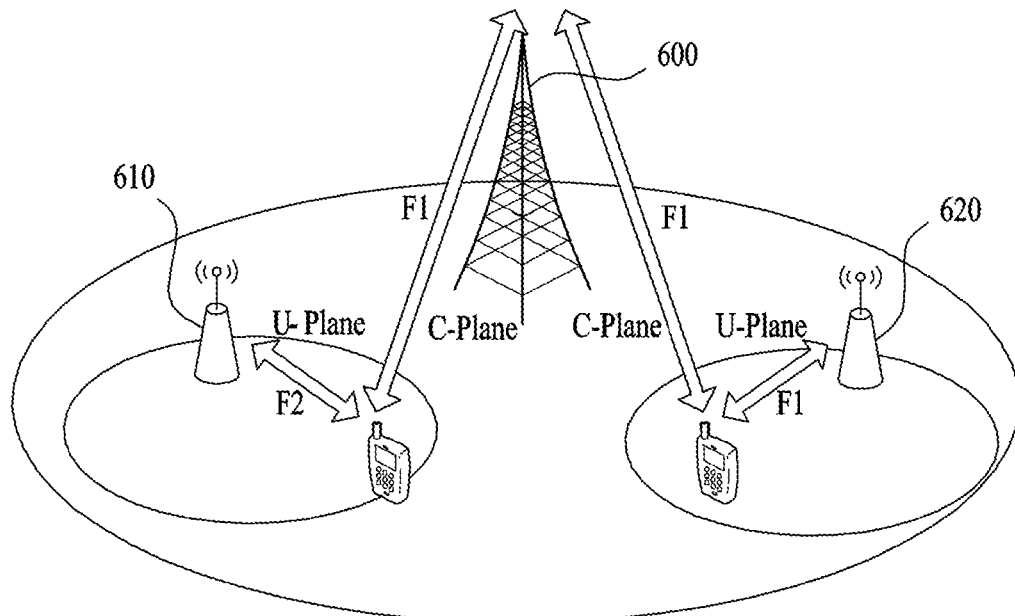
FIG. 6 is a diagram illustrating the concept of dual connectivity usable in the present invention.

FIG. 6 is a diagram illustrating the concept of dual connectivity usable in the present invention.

Referring to FIG. 6, carrier aggregation may be performed between a macro cell 610 (?? 600) and small cells 620 and 630 (?? 610 and 620). That is, the macro cell may use n carriers (where n is an arbitrary positive integer) and each of the small cells may use k carriers (where k is an arbitrary positive integer). In this case, carriers of the macro cell and the small cell may include the same frequency carriers or different frequency carriers. For example, the macro cell may use arbitrary frequencies F1 and F2 and the small cell may use arbitrary frequencies F2 and F3.

A UE positioned within coverage of the small cell may be simultaneously connected to the macro cell and the small cell. The UE may simultaneously receive a service from the macro cell and the small cell or may receive a service by Time Division Multiplexing (TDM) scheme. The UE may receive a service of a function provided in a Control Plane (C-plane) (e.g., connection management or mobility) through a macro cell layer and select either the macro cell or the small cell or both the macro cell and the small cell as a User Plane (U-plane) data path. For example, the UE may transmit/receive real-time data, such as Voice over LTE (VoLTE), to/from the macro cell that guarantees mobility, rather than to/from the small cell, and receive a best effect service from the small cell. The macro cell and the small cell may be connected by backhaul which may be ideal backhaul or non-ideal backhaul.

The macro cell and the small cell may be configured by the same TDD system or the same FDD system or by different TDD systems or different FDD systems.

In FIG. 6, the concept of dual connectivity is illustrated. It may be appreciated that the macro cell and the small cell use the same frequency band or different frequency bands. An arbitrary UE for which dual connectivity is configured may be simultaneously connected to the macro cell and the small cell. FIG. 6 illustrates the case in which the U-plane data path is configured by the small cell.

While, in the present invention, the UE connected to the macro cell and the small cell through dual connectivity has been described, this is purely for convenience and the present invention is not limited to cell types such as a macro cell, a micro cell, a pico cell, and a femto cell. In addition, while the above description has been given of the dual-connectivity UE configuring the macro cell as a primary cell and configuring the small cell as a secondary cell, through Carrier Aggregation (CA), this is purely for convenience and application of the present invention is not limited even when the UE is configured differently from the above configuration.

Particularly, the present invention includes the case in which one UE is connected by dual connectivity to an LTE system based eNB and to an NR system based transmission and reception point.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 7:
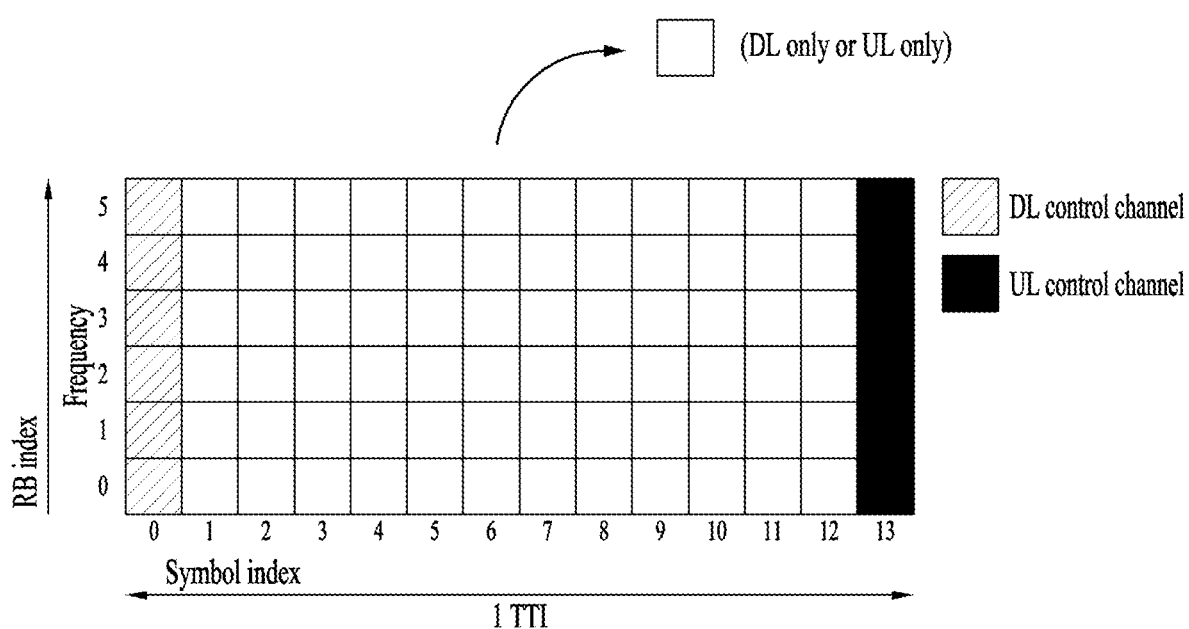
FIG. 7 is a diagram illustrating a self-contained subframe structure applicable to the present invention.

FIG. 7 is a diagram illustrating a self-contained subframe structure applicable to the present invention.

In the NR system to which the present invention is applicable, a self-contained subframe structure as shown in FIG. 7 is proposed in order to minimize data transmission latency in the TDD system.

In FIG. 7, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 7.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
|---|---|
| Subcarrier-spacing ($\Delta f$) | 75 kHz |
| OFDM symbol length | 13.33 µs |
| Cyclic Prefix (CP) length | 1.04 µs/0.94 µs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
|---|---|---|---|---|
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 µs/4.69 µs | 2.60 µs/2.34 µs | 1.30 µs/1.17 µs | 0.65 µs/0.59 µs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
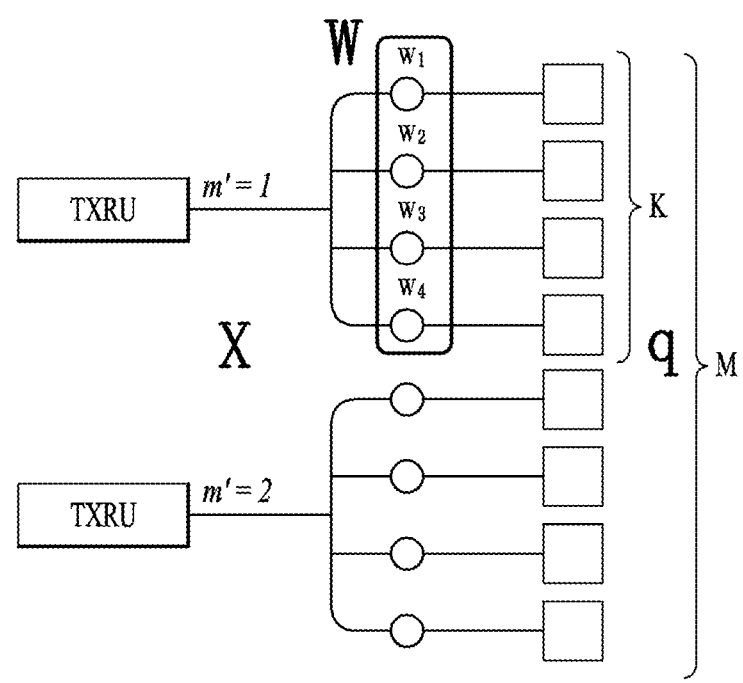
FIGS. 8 and 9 are diagrams illustrating representative methods for connecting TXRUs to antenna elements.
Figure 9:
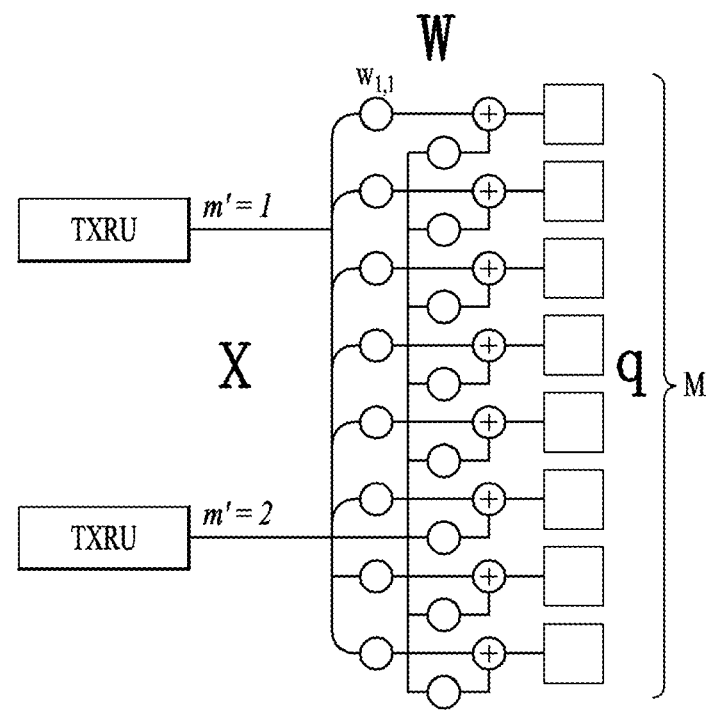
Figure 10:
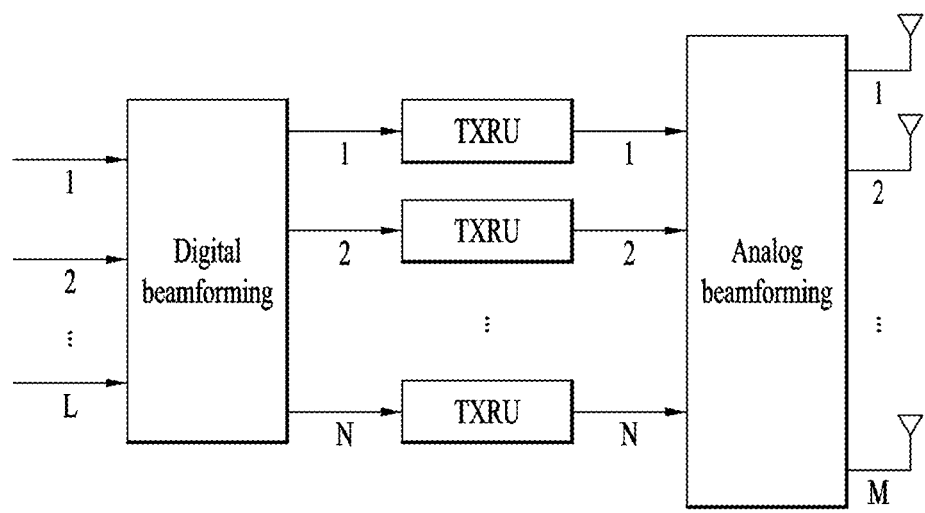
FIG. 10 is a diagram schematically illustrating a hybrid beamforming structure in terms of a TXRU and a physical antenna.
Figure 11:
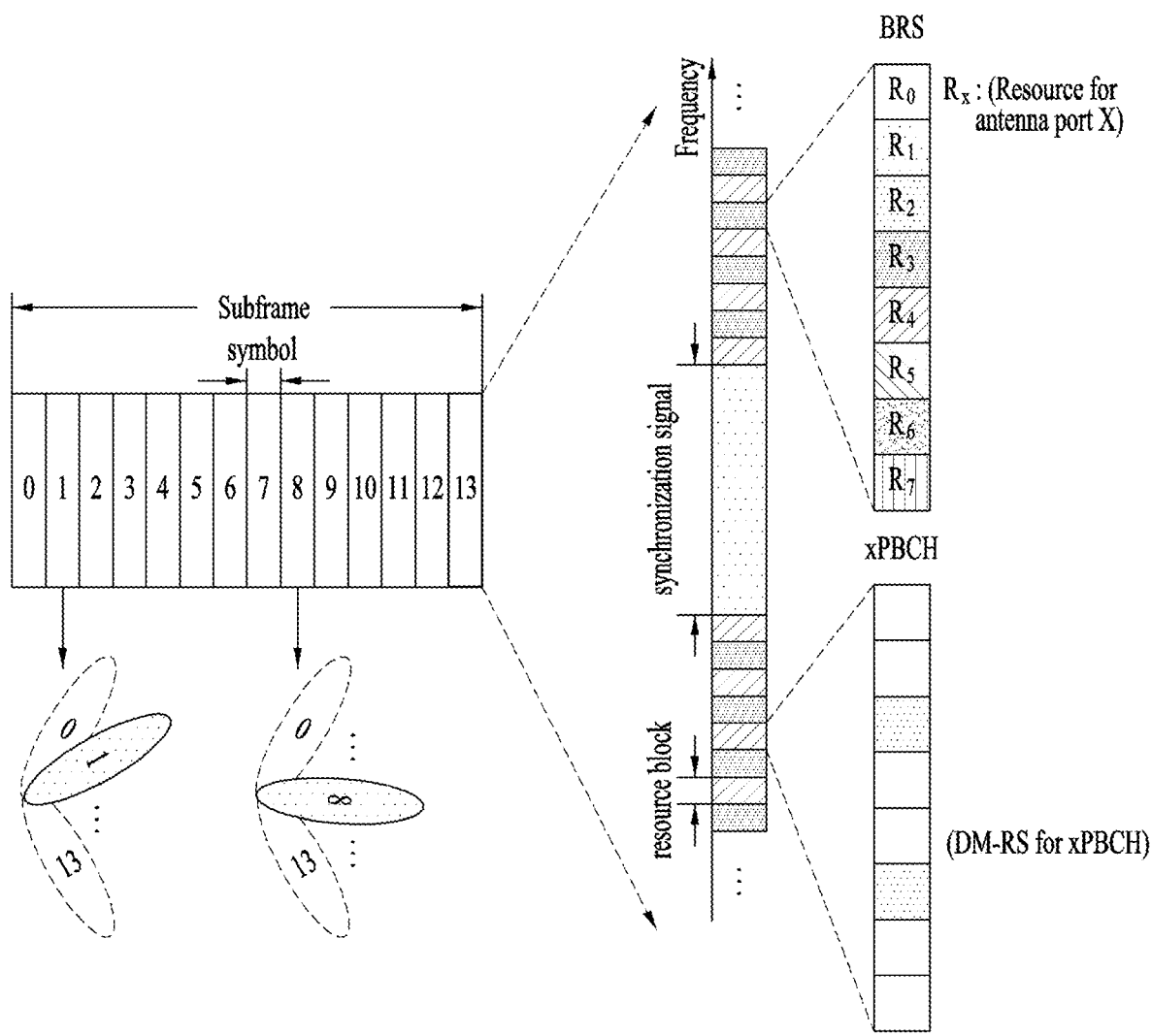
FIG. 11 is a diagram schematically illustrating a beam sweeping operation for a synchronization signal and system information in a downlink transmission process.

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to subarrays. In FIG. 8, one antenna element is connected to one TXRU.

Meanwhile, FIG. 9 shows a method for connecting all TXRUs to all antenna elements. In FIG. 9, all antenna element are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

3. Proposed Embodiment

In the NR system to which the present invention is applicable, a network slicing scheme is considered to achieve a plurality of logical networks over a single physical network. Particularly, the logical networks that are desired to be implemented in the NR system consider support of services of various purposes (e.g., Enhanced Mobile Broadband (eMBB), massive Machine Type Communication (mMTC), Ultra-Reliable and Low-Latency Communication (URLLC), etc.). In this case, a wireless communication system (or a physical layer) of the NR system considers a flexible structure capable of applying an OFDM scheme having a numerology suitable for a service to be provided. In other words, the NR system may consider an OFDM scheme (or a multiple access scheme) having a different numerology in each time and frequency resource region.

Recently, as data traffic abruptly increases with appearance of smart devices, the NR system to which the present invention is applicable is needed to support higher communication capacity (e.g., data throughput).

One method considered to raise communication capacity is to transmit data using a plurality of transmission (or reception) antennas. If digital BF is desired to be applied to the plural antennas, each antenna requires a Radio Frequency (RF) chain (e.g., a chain consisting of RF elements such as a power amplifier and a down converter) and a Digital-to-Analog (D/A) or Analog-to-Digital (A/D) converter. This structure increases hardware complexity and consumes high power which may not be practical. Accordingly, when the plural antennas are used, the NR system according to the present invention considers a hybrid BF scheme in which digital BF and analog BF are combined.

Hereinafter, the present invention will assume a situation in which, in a wireless communication system including an eNB and a UE, the UE is connected to a Master Cell Group (MCG) and a Secondary Cell Group (SCG) (which is dedicated to data transmission) according to a Dual Connectivity (DC) operation and the SCG supports the NR system to operate a plurality of analog beams (based on an analog phase shifter).

Herein, the SCG may imply a cell group, data transmission of which to the UE is determined according to whether the MCG configures the SCG.

Meanwhile, in order to aid in determining whether or not the MCG is to configure the SCG for the purpose of RRM, the UE may perform RRM measurement for the SCG and report the RRM measurement result to a network. In addition, in order to aid in determining an analog beam through which the SCG is to provide a data service, the UE may perform a beam-specific measurement for the SCG and report the measurement result to the network.

In other words, DL measurement that the UE according to the present invention performs for the SCG may include the following two types of measurement.

(1) RRM Measurement
RRM measurement is performed for the purpose of addition/release or activation/deactivation of an NR SCG (2) Beam-Specific Measurement
Beam-specific measurement is performed for the purpose of analog beam (hereinafter, a serving beam) configuration for data reception within the NR SCG Hereinbelow, the present invention will propose a method of performing and reporting RRM measurement and beamspecific measurement by the UE in the above-described DC situation. Herein, the MCG may be an object operated according to the LTE system. In addition, the MCG may correspond to an MeNB (a specific eNB within the MCG) and the SCG may correspond to an SeNB (a specific eNB within the SCG).

Hereinafter, for convenience of description, a Reference Signal (RS) transmitted for the purpose of RRM measurement will be referred to as an RRM RS and an RS transmitted for the purpose of beam-specific measurement will be referred to as an BRS.

The BRS may be included in the RRM RS according to an embodiment.

Hereinafter, in association with the concept of RSRP, RSSI, and RSRQ of the LTE system, an average received power (per RE) for the RRM RS in the NR system to which the present invention is applicable will be defined as xRSRP, an average received power considering all signals within a symbol in the NR system will be defined as an xRSSI, and an index indicating a relative ratio between xRSRP and xRSSI in the NR system will be defined as sRSRQ (i.e., xRSRQ∝xRSRP/xRSSI). Thus, an RRM measurement result for an NR eNB according to the present invention may include xRSRP, xRSRQ, and xRSSI.

In the following description, an analog beam may be replaced with a narrow beam having the same precoding value for frequency resources in terms of a general viewpoint. Even in this case, the operation principle of the present invention may be equally applied in an extended form.

3.1. Method of Performing and Reporting DL Measurement 3.1.1. Method of Performing and Reporting First DL Measurement When a UE is connected to an MCG and to an SCG implementing analog BF according to a DC operation, the UE may perform and report RRM measurement for the SCG through the following procedures.

(1) The MCG may transmit SCG information, which is an RRM measurement target including (analog beam-specific) RRM RS information (e.g., time and frequency resources and/or a sequence) transmitted by the SCG, to the UE through a higher-layer signal (e.g., RRC signaling).

(2) Then, the UE may perform RRM measurement for an eNB within a specific SCG as follows (according to a command of the MCG).

(2)-1) RRM measurement is performed per analog beam.

(2)-2) RRM measurement is performed based on a received signal for a best analog beam (in terms of UE reception) (every measurement timing).

(3) Next, the UE may report an RRM measurement result measured for the SCG to the MCG (that has commanded the UE to perform RRM measurement) through a higher-layer signal (e.g., RRC signaling) as follows.

(3)-1) An event trigger scheme. In other words, if an RRM measurement value for the SCG satisfies a specific condition, the UE may report the RRM measurement value.

(3)-2) If the MCG commands the UE to report a measurement value through L1 or L2 signaling, the UE reports the measurement value.

As a specific example of the present invention, the UE may perform RRM measurement per analog beam or perform RRM measurement per cell. Upon performing RRM measurement per beam, the UE may assume that RRM measurement (e.g., RSRP) for a serving beam is RRM measurement (e.g., RSRP) for a serving cell (secondary cell (SCell)). This operation may be applied to a scheme in which the UE reports an RRM measurement value for the serving cell to the MCG when a beam (e.g., serving beam) is changed.

When the UE acquires an average value for a best (analog) beam (in terms of UE reception) per cell through long-term measurement, if the best (analog) beam is changed, an additional operation in which the UE resets RRM measurement or differently assigns a weight for a new result (e.g., measurement value) may be considered.

RRM measurement proposed in the present invention may be used for the purpose of addition/release of an SCG. Therefore, even though the UE has performed RRM measurement using an RRM resource transmitted by the SCG, a measurement result is desirably reported to the MCG that is capable of determining addition/release of the SCG.

Unlike this case, if the UE transmits the RRM measurement result for the SCG to the SCG, the SCG should transmit corresponding information to the MCG through a backhaul network because the SCG cannot determine addition/release of the SCG. In this process, an unnecessary backhaul delay may occur. Therefore, the UE according to the present invention may directly transmit the RRM measurement result for the SCG to the MCG through a radio signal.

To this end, as an entire process, the MCG may configure resource information for RRM measurement for the SCG which is a measurement target and the UE may correspondingly perform the RRM measurement for the SCG and report a measurement result to the MCG. Herein, since a higher-layer entity such as a Mobility Management Entity (MME) may be involved in the RRM measurement result (e.g., mobility management of the UE mainly means handover between cells and the higher-layer entity collects RRM measurement values for a plurality of cells and manages handover to the UE based on the measurement values), the UE may report the RRM measurement result to the MCG through a higher-layer signal such as RRC signaling. However, a reporting timing of the RRM measurement value of the UE may be indicated by the MCG. As a specific example, a UL resource may be allocated only if the event trigger scheme is applied or the MCG requires reporting, and a reporting indication may be supported for the UE through L1/L2 signaling.

3.1.2. Method of Performing and Reporting Second DL Measurement

When a UE is connected to an MCG and to SCG implementing analog BF according to a DC operation, the UE may perform and report beam-specific measurement for analog beams within the SCG as follows.

(1) BRS information (e.g., time and frequency resources and/or a sequence) for the SCG may be transmitted to the UE as follows.

(1)-1) The MCG transmits the BRS information through a higher-layer signal (e.g., RRC signaling)

(1)-2) The SCG transmits the BRS information through the higher-layer signal (e.g., RRC signaling) or system information (2) The UE may perform beam-specific measurement per analog beam for analog beams within a specific SCG (according to a command of the SCG).

(3) The UE may report a beam-specific measurement value measured for the SCG to an SCG (that has commanded the UE to perform beam-specific measurement) through L1 or L2 signaling by the following methods.

(3)-1) Event trigger scheme. In other words, if an RRM measurement value for the SCG satisfies a specific condition, the UE may report the RRM measurement value.

(3)-2) If the MCG commands the UE to report the measurement value through L1 or L2 signaling, the UE reports the measurement value.

In the present invention, the beam-specific measurement value may be used for the purpose of selecting an analog beam for data transmission by the SCG. Therefore, it is desirable for the UE to perform and report beam-specific measurement at a timing when the SCG requires information about beam-specific measurement.

However, when taking into account resource inefficiency during cell-common information transmission using an analog BF scheme, the MCG, instead of the SCG, may inform the UE of the BRS information for the SCG through the higher-layer signal such as RRC signaling. Alternatively, for reliability, the MCG may inform the UE of the BRS information for the SCG and the SCG may inform the UE of the BRS information through the higher-layer signal or system information.

Next, the UE may perform measurement per analog beam and report analog beam information (e.g., received strength of the BRS and information about M best beams) in terms of reception to the SCG. In this case, a reporting timing of the beam-specific measurement value may be indicated by the SCG. As a specific example, a UL resource may be allocated only if the event trigger scheme is applied or the MCG requires reporting, and a reporting indication through L1/L2 signaling may be supported for the UE.

Figure 12:
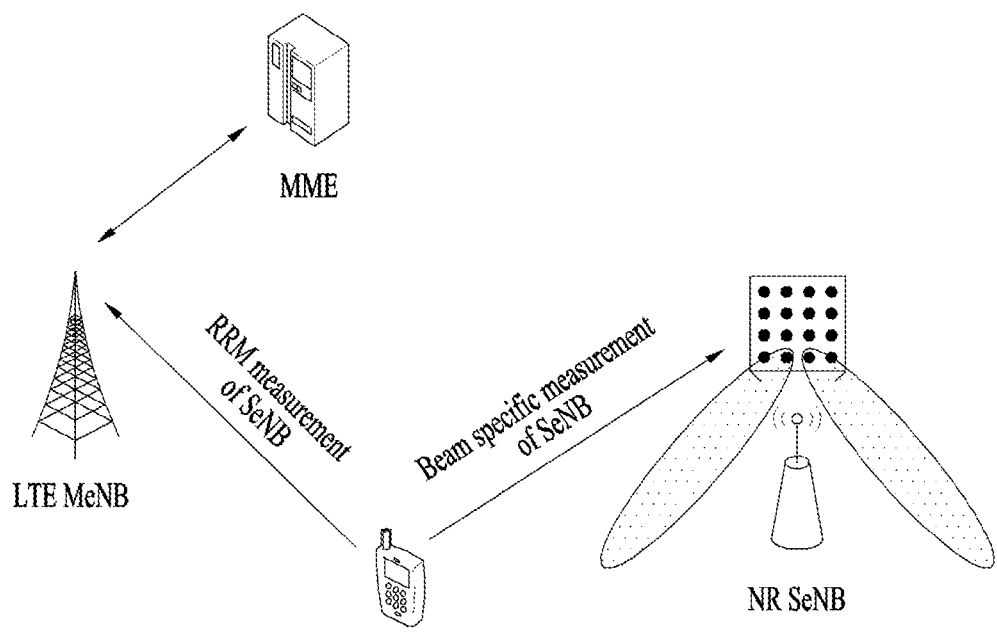
FIG. 12 is a diagram schematically illustrating an operation of reporting result values of RRM measurement and beam-specific measurement, which is applicable to the present invention.

FIG. 12 is a diagram schematically illustrating an operation of reporting result values of RRM measurement and beam-specific measurement, which is applicable to the present invention.

As illustrated in FIG. 12, the UE may transmit a result value of RRM measurement and a result value of beam-specific measurement through different configurations.

3.1.3. Method of Performing and Reporting Third DL Measurement

When a UE is connected to an MCG and to an SCG implementing analog BF according to a DC operation, the MCG may inform the UE of the following information about an RRM RS (or BRS) for the SCG.

(1) (Periodic) time duration in which the UE is to perform RRM RS (or BRS) detection. Herein, the time duration may be one subframe (SF) (or transmission time interval (TTI)).

(2) The following information may be provided as analog beam information about a (periodic) time duration in which the UE is to perform RRM RS (or BRS) detection.

(2)-1) An independent analog beam applied in units of symbols within the time duration (2)-2) An independent analog beam applied in unit of N consecutive symbols within the time duration. Herein, the same analog beam may be (repeatedly) applied within the N symbols. The UE may assume that the value of N is commonly applied to all neighbor cells of one frequency band (i.e., intra-band).

In this configuration, the MCG may inform the UE of the RRM RS (or BRS) information through the higher-layer signal (e.g., RRC signaling).

In the present invention, when the UE performs RRM measurement or beam-specific measurement as DL measurement for the SCG, an RRM RS (or BRS) transmission method of the SCG should be considered. In an environment in which analog BF is applied, the RRM RS (or BRS) is desirably transmitted to a plurality of analog beams operated by the SCG. Therefore, the SCG may transmit the RRM RS (or BRS) in the form of sweeping a plurality of analog beams within a predetermined time duration.

The beam-swept RRM RS (or BRS) may be transmitted by applying an independent analog beam per symbol within a predetermined time duration. Alternatively, the beam-swept RRM RS (or BRS) may be transmitted by applying an independent analog beam per N symbols within a predetermined time duration and the RRM RS (or BRS) within the N symbols may be transmitted by applying repetition of N times for the same analog beam.

Figure 13:
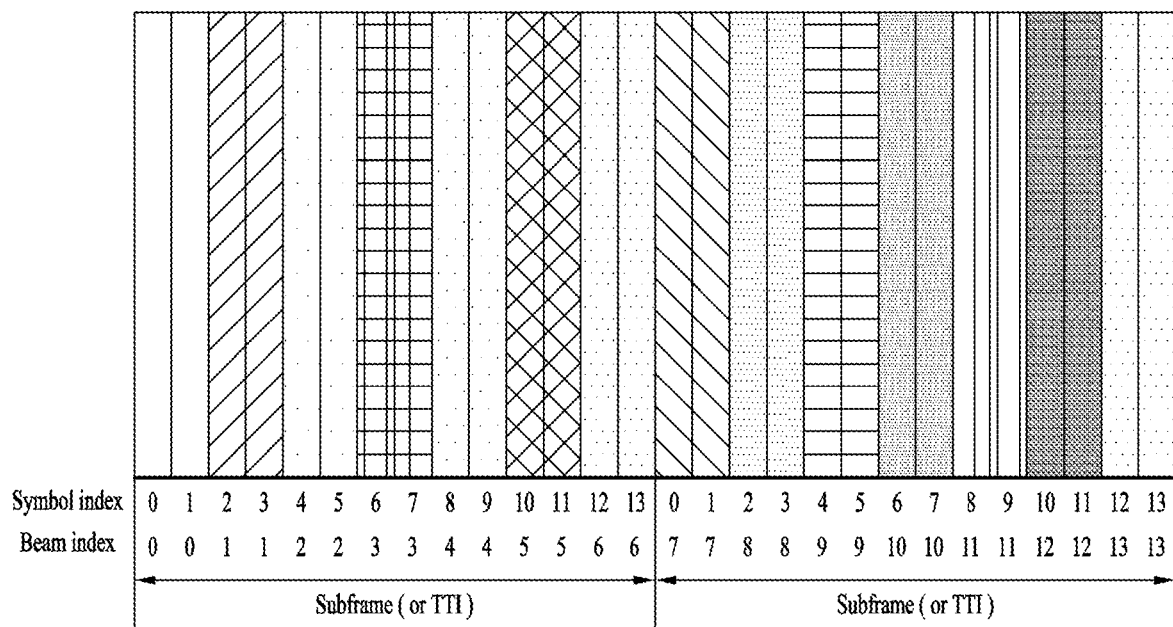
FIG. 13 is a diagram illustrating a configuration in which 14 analog beams are transmitted in two subframes by repeating each of the 14 analog beams in two symbols when one subframe includes 14 symbols.

FIG. 13 is a diagram illustrating a configuration in which 14 analog beams are transmitted in two SFs by repeating each of the 14 analog beams in two symbols when one SF includes 14 symbols. As illustrated in an example of FIG. 13, an SCG may repeatedly transmit each RRM RS (or BRS) in two symbols.

In terms of a DC situation characteristic proposed in the present invention, information about a resource on which the RRM RS (or BRS) is transmitted by the SCG may be indicated to the UE by the MCG having higher reliability rather than by the SCG in which a serving beam may be unstable. The UE may correspondingly perform RRM measurement or beam-specific measurement using the RRM RS (or BRS) resource information transmitted by the MCG.

3.2. Beam Change and Recovery Process 3.2.1. First Beam Change and Recovery Method When a UE is connected to an MCG and to an SCG implementing analog BF according to a DC operation, if an analog beam operation scheme within the SCG is changed, the MCG may inform the UE of the following information.

(1) Information as to Whether the Analog Beam Operation Scheme for the SCG is Changed and Information about a Changed Serving Beam In this case, the above information may be transmitted through L1 or L2 signaling (e.g., DCI or a Medium Access Control (MAC) Control Element (CE)) via the MCG.

As a modified example, the UE may report the corresponding information to the MCG. Alternatively, the UE may transmit an RRM measurement result for a serving beam of the SCG to the MCG and also transmit a best (analog) beam index (in terms of UE reception) during RRM measurement. In this case, such information may be regarded as an analog beam index for the serving beam.

As another modified example, the UE may trigger a Power Head Room (PHR) during beam switching (or during change in the serving beam). In this case, the UE may transmit serving beam information (e.g., analog beam index for the serving beam) in the PHR.

(2) System Information about (Changed) Serving Beam

The system information may include UL power control, random access, and broadcast channel related information.

The system information may be transmitted through the higher-layer signal (e.g., RRC signaling) or L1 or L2 signaling (e.g., DCI or a MAC CE) via the MCG. This scheme may imply an scheme of preinforming the UE of an RRC parameter set for the SCG through the MCG and indicating an index applied to the RRC parameter set through L1/L2 signaling (via the MCG), a scheme of transmitting a part of RRC parameters through the SCG, or a scheme of transmitting RRC parameters with respect to a specific parameter through L1/L2 signaling (via the MCG). Herein, the RRC parameters may mean the system information.

In the above-described configuration, a change in the analog beam operation scheme may imply that an analog phase shift value applied to a corresponding analog beam is changed.

In the present invention, when the SCG performs an operation of generating an analog beam (i.e., an operation in which the SCG forms the analog beam using an analog phase shift value different from a previous value), the UE may not recognize that analog beam(s) of the SCG are changed. Particularly, when the SCG changes an analog phase shift value applied to an analog beam index preconfigured as a serving beam, the UE experiences a situation in which the serving beam is actually changed although the serving beam has not been changed in an analog beam index.

Accordingly, in this case, the UE may not perform smooth communication with the SCG and needs to search for the serving beam by performing a random access procedure again.

As a method for solving this problem, the MCG which provides stable communication may inform the UE of information about a change in the analog beam operation scheme of the SCG and, if possible, provide even information about the changed serving beam. In this case, as system information changed according to the serving beam, UL power control, random access, and broadcast channel information may also be indicated by the MCG to the UE through the higher-layer signal such as RRC signaling. Then, the UE may perform data transmission and reception according to the changed analog beam operation scheme within the SCG by the help of the MCG.

As a more specific example, upon receiving information about the number of SCGs and a change in the serving beam from the MCG, the UE may change (add/reduce) a reporting target during subsequently performed beam measurement and reporting.

3.2.2. Second Beam Change and Recovery Method

When a UE is connected to an MCG and to an SCG operating analog BF according to a DC operation, (if the UE determines that the UE has missed a serving beam for the SCG) the UE may transmit the following information to the MCG.

(1) Radio link failure (RLF) reporting for SCG

Herein, RLF for the SCG may be defined based on a reception possibility of a control channel or an RRM measurement value. Alternatively, RLF for the SCG may be defined based on whether a recovery time of the serving beam exceeds a predetermined time. Alternatively, RLF for the SCG may be defined based on whether a time duration in which an RRM measurement of the serving beam or beam-specific measurement value is lower than that of a best beam (in terms of UE reception) by a predetermined offset or threshold exceeds a predetermined time.

As an example, when a cell ID of the best beam is different from a cell ID of the serving beam, the UE may declare RLF and request that fast SCG handover (or SCG release or SCG change) be performed.

(2) Request for a report of a beam-specific measurement value for the SCG (3) Request for a change in a serving beam for the SCG (4) When the UE determines that it is difficult to perform a narrow beam operation due to mobility of the UE, the UE may transmit a request for a wider beam operation of the SCG to the MCG (and/or the SCG).

In the above operation, the UE may additionally transmit corresponding information to the SCG upon reporting the above information to the MCG. Alternatively, the MCG may transmit the information received from the UE to the SCG.

In the above operation, when the UE requests that the MCG report a beam-specific measurement value for the SCG, a UL resource for reporting to the UE may be allocated by the SCG.

In the present invention, when the UE transmits information corresponding to (2) or (3) to the MCG, the UE may transmit an analog beam index desired thereby or for a best beam (in terms of UE reception) together with the corresponding information.

Alternatively, transmission of the information of (2) or (3) by the UE may be interpreted as a request for beam measurement trigger (from the viewpoint of the MCG). In this case, the MCG may cause the SCG to perform a fallback operation by transmitting a corresponding message to the SCG or directly transmit a beam measurement request (to the UE) (together with beam measurement).

Upon receiving the beam measurement request from the MCG, the UE may perform beam measurement based on an RRM RS or a BRS for the SCG. In this case, even though the UE receives the beam measurement request from the MCG, the UE may transmit reporting for a measurement value to the SCG.

During the fallback operation of the SCG, the SCG may transmit the beam measurement request in all analog beam directions and (if any analog beam direction indicated by the UE is present) in the analog beam direction indicated by the UE.

In the case of a UE having fast mobility or a UE performing a discontinuous reception (DRX) operation (e.g., an operation in which the UE alternately performs a sleeping mode in which the UE does not attempt to detect a DL control channel in units of a predetermined time in order to save a battery of the UE an d a wakeup mode in which the UE attempts to detect the DL control channel), the case in which a serving beam configured by the eNB for DL signal transmission and an analog beam through which the UE is capable of detecting a DL signal from the eNB (hereinafter, a hearable beam) differ may occur. As a more specific example, if the UE desires to receive a DL signal again after the UE has not received the DL signal for a predetermined time, a serving beam configured by the eNB may differ from a hearable beam through which the UE may detect the DL signal from the eNB.

In this case, the UE may report disconnection thereof to the SCG, request that the serving beam be changed, or request that a beam-specific measurement value be reported.

However, in this above situation, UL transmission between the UE and the SCG may not be smooth. Accordingly, if the UE still can communicate with the MCG due to the DC operation, the UE may report RLF or non-RLF for the SCG, request that the serving beam be changed, or request that the beam-specific measurement value be reported.

While the UE transmits the above information to the MCG, the UE may simultaneously transmit the information to the SCG.

Figure 14:
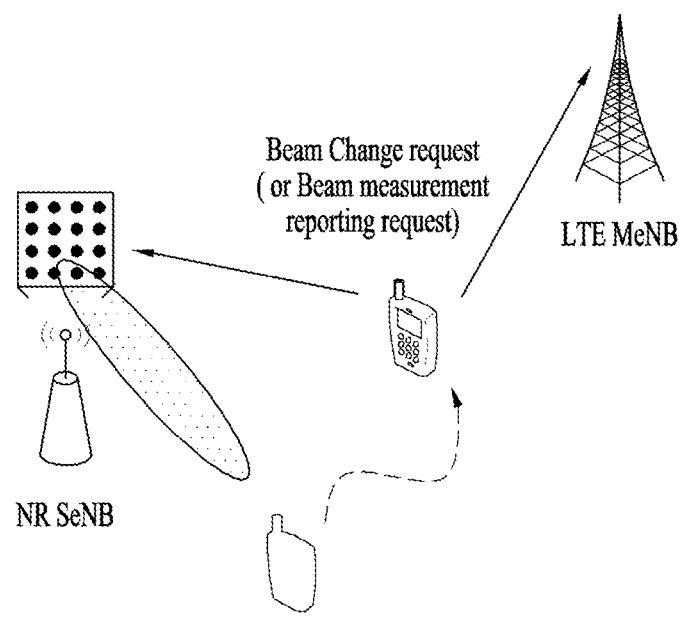
FIG. 14 is a diagram illustrating an operation in which a UE transmits specific information to a mater cell group (MCG) (and/or a secondary cell group (SCG)) (when the UE determines that the UE has missed a serving beam for the SCG) according to the present invention.

FIG. 14 is a diagram illustrating an operation in which a UE transmits specific information to an MCG (and/or an SCG) (when the UE determines that the UE has missed a serving beam for the SCG) according to the present invention.

As illustrated in FIG. 14, the UE may transmit the above information to the MCG and the SCG.

Alternatively, the MCG may transmit the information received from the UE to the SCG. Then, the SCG may support the UE so that the UE may perform a serving beam reconfiguration process.

The UE according to the present invention may report RS measurement information according to the following method based on the above description.

More specifically, in a wireless communication system including a master base station and a secondary base station which is operated under control of the master base station and operates a plurality of analog beams, the UE may be connected to the master base station and secondary base station by a DC scheme to report RS measurement information for the secondary base station.

In this case, the UE may calculate measurement values according to one or more of a first measurement method of measuring signal quality of the secondary base station, based on an RS transmitted by the secondary base station, and a second measurement method of measuring an optimal analog beam for data transmission among the plural analog beams operated by the secondary base station.

Next, the UE may transmit the measurement values calculated according to one or more of the first measurement method and the second measurement method to the master base station or the secondary base station. Characteristically, the UE may transmit the measurement value calculated according to the first measurement method to the master base station and transmit the measurement value calculated according to the second measurement method to the secondary base station.

Herein, the UE may additionally receive information about the RS from the master base station.

The information about the RS may include one or more of a time resource on which the RS is transmitted, a frequency resource on which the RS is transmitted, and a sequence applied to the RS.

In the present invention, the measurement value calculated according to the first measurement method may include one or more of information about average received power for the RS per analog beam and information about average received power for the RS transmitted by the secondary base station during a predetermined duration.

In this case, if the measurement value calculated according to the first measurement method satisfies a predetermined condition or if the master base station commands the UE to report a measurement result, the measurement value calculated according to the first measurement method may be transmitted to the master base station.

In the present invention, the measurement value calculated according to the second measurement method may include one or more of received strength for the RS per analog beam and information about one or more analog beams having reception performance of a predetermine value or more among the plural analog beams.

If the measurement value calculated according to the second measurement method satisfies a specific condition or if the secondary base station commands the UE to report a measurement result, the measurement value calculated according to the second measurement method may be transmitted to the secondary base station.

The UE may additionally receive analog beam information during a time duration in which the measurement values according to one or more of the first measurement method and the second measurement method based on the RS from the master base station are calculated.

In this case, the analog beam information may include information about an analog beam applied in units of one or more symbols.

The UE may additionally receive, from the master base station, information as to whether there is a change in an analog beam operation scheme of the secondary base station and information about a changed serving beam.

The change in the analog beam operation scheme of the secondary base station may include a change in an analog phase shift value applied to a serving beam of the secondary base station.

If the UE determines that the UE and the secondary base station are disconnected, the UE may transmit a signal for requesting a report of the measurement value calculated according to the second measurement method to the master base station and receive a signal for triggering the report of the measurement value calculated according to the second measurement method from the master base station. Next, the UE may calculate the measurement value according to the second measurement method, based on the signal for triggering the report of the measurement value calculated according to the second measurement method, and transmit the measurement value according to the second measurement method to the secondary base station.

Since examples of the above-described proposal method may also be included in one of implementation methods of the present invention, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

4. Construction of Apparatuses

Figure 15:
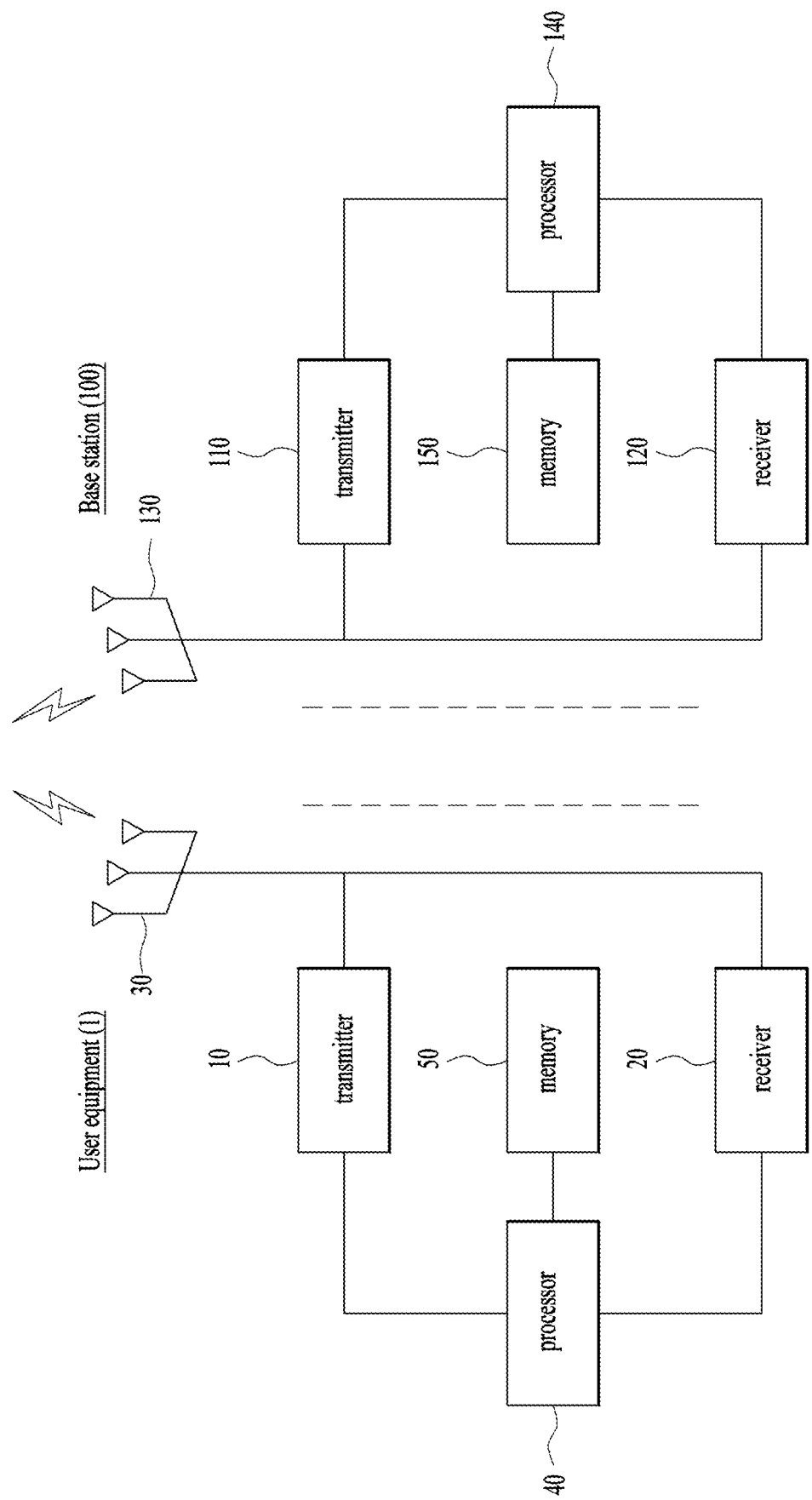
FIG. 15 is a diagram illustrating construction of a UE and an eNB in which proposed embodiments can be implemented.

FIG. 15 is a diagram illustrating construction of a UE and an base station in which proposed embodiments can be implemented. The UE and the base station illustrated in FIG. 15 are operated to implement embodiments of the above-described RS measurement report method of the UE.

A UE 1 may act as a transmission end on a UL and as a reception end on a DL. A base station (eNB or gNB) 100 may act as a reception end on a UL and as a transmission end on a DL.

As illustrated in FIG. 12 or 14, when the UE 1 according to the present invention transmits and receives signals to and from different two base station (eNB and gNB), those skilled in the art will easily interpret the eNB 100 of FIG. 15 as the eNB or the gNB according to each signal transmission and reception system.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

In a wireless communication system including a master base station 100 and a secondary base station 100 which is operated under control of the master base station 100 and operates a plurality of analog beams, the UE 1 configured as described above may be connected to the master base station 100 and the secondary base station 100 by a DC scheme and may report RS measurement information for the secondary base station 100 through the following methods.

The UE 1 calculates a measurement value according to one or more of a first measurement method of measuring signal quality of the secondary base station 100 based on an RS transmitted by the secondary base station 100 through the processor 40 and a second measurement method of measuring an optimal analog beam for data transmission among a plurality of analog beams operated by the secondary base station 100. Next, the UE 1 transmits the measurement value calculated according to one or more of the first measurement method and the second measurement method to the master base station 100 or the secondary base station 100.

Particularly, according to the present invention, the UE 1 may transmit the measurement value calculated based on the first measurement method to the master base station 100 and transmit the measurement value based on the second measurement method to the secondary base station.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of reporting reference signal measurement information for a secondary base station by a user equipment, connected to a master base station and the secondary base station by a dual connectivity scheme, in a wireless communication system comprising the master base station and the secondary base station being operated under control of the master base station and operating a plurality of analog beams, the method comprising:
    calculating a measurement value according to one or more of:
        (i) a first measurement method of measuring signal quality of the secondary base station based on a reference signal transmitted from the secondary base station, or
        (ii) a second measurement method of measuring an optimal analog beam for data transmission among a plurality of analog beams operated by the secondary base station; and
    transmitting the measurement value according to one or more of the first measurement method or the second measurement method to the master base station or the second base station,
    wherein the measurement value calculated according to the first measurement method is transmitted to the master base station and the measurement value calculated according to the second measurement method is transmitted to the secondary base station.

2. The method of claim 1, further comprising:
    receiving information regarding the reference signal from the master base station.

3. The method of claim 2, wherein the information regarding the reference signal comprises at least one of:
    a time resource on which the reference signal is transmitted,
    a frequency resource on which the reference signal is transmitted, or
    a sequence applied to the reference signal.

4. The method of claim 1, wherein the measurement value calculated according to the first measurement method comprises at least one of:
    (i) information regarding average received power for the reference signal per analog beam, or
    (ii) information regarding average received power for the reference signal transmitted by the secondary base station during a predetermined duration.

5. The method of claim 1, wherein when the measurement value calculated according to the first measurement method satisfies a predetermined condition or the master base station commands the user equipment to report a measurement result:
    the measurement value calculated according to the first measurement method is transmitted to the master base station.

6. The method of claim 1, wherein the measurement value calculated according to the second measurement method comprises at least one of:
    a received strength for the reference signal per analog beam, or
    information regarding one or more analog beams, among the plurality of analog beams, having reception performance of at least a predetermined value.

7. The method of claim 1, wherein when the measurement value calculated according to the second measurement method satisfies a specific condition or the secondary base station commands the user equipment to report a measurement result:
the measurement value calculated according to the second measurement method is transmitted to the secondary base station.

8. The method of claim 1, further comprising:
receiving analog beam information during a time duration in which the measurement value according to one or more of the first measurement method or the second measurement method based on the reference signal from the master base station is calculated.

9. A user equipment for reporting reference signal measurement information for a secondary base station, the user equipment being connected to a master base station and the secondary base station by a dual connectivity scheme, in a wireless communication system comprising the master base station and the secondary base station being operated under control of the master base station and operating a plurality of analog beams, the user equipment comprising:
a transmitter;
a receiver;
at least one processor; and
at least one computer memory operably connectable to the at least one processor and storing instructions that, when executed by the at least one processor, perform operations comprising:
calculating a measurement value according to one or more of:
(i) a first measurement method of measuring signal quality of the secondary base station based on a reference signal transmitted from the secondary base station, or
(ii) a second measurement method of measuring an optimal analog beam for data transmission among a plurality of analog beams operated by the secondary base station; and
transmitting the measurement value according to one or more of the first measurement method or the second measurement method to the master base station or the second base station,
wherein the measurement value calculated according to the first measurement method is transmitted to the master base station and the measurement value calculated according to the second measurement method is transmitted to the secondary base station.

10. The method of claim 8, wherein the analog beam information comprises information regarding an analog beam applied in units of one or more symbols.

11. The method of claim 1, further comprising:
receiving, from the master base station, (i) information as to whether there is a change in an analog beam operation scheme of the secondary base station, and (ii) information regarding a changed serving beam.

12. The method of claim 11, wherein the change in the analog beam operation scheme of the secondary base station comprises a change in an analog phase shift value applied to a serving beam of the secondary base station.

13. The method of claim 1, further comprising:
upon determining that the user equipment and the secondary base station are disconnected, transmitting a signal for requesting a report of the measurement value calculated according to the second measurement method to the master base station; and
receiving a signal for triggering the report of the measurement value calculated according to the second measurement method from the master base station,
wherein the user equipment calculates the measurement value according to the second measurement method, based on the signal for triggering the report of the measurement value calculated according to the second measurement method, and transmits the measurement value according to the second measurement method to the secondary base station.

14. The method of claim 13, wherein when a serving beam of the secondary base station and a hearable beam for detecting a signal transmitted from the secondary base station are different, it is determined that the user equipment and the secondary base station are disconnected.

* * * * *